United States Patent [19]
Tanimura et al.

[11] Patent Number: 5,155,935
[45] Date of Patent: Oct. 20, 1992

[54] ASSEMBLY OF POTS FOR RAISING AND TRANSPLANTATION

[75] Inventors: Masashi Tanimura; Ryuzo Tsuru; Michinori Sakaki; Sumio Ito; Hidekazu Terasawa, all of Obihiro, Japan

[73] Assignee: Nihon Tensaiseito Kabushiki Kaisha, Tokyo, Japan

[21] Appl. No.: 748,454

[22] Filed: Aug. 22, 1991

[30] Foreign Application Priority Data

Aug. 30, 1990 [JP] Japan ................. 2-90087[U]

[51] Int. Cl.$^5$ ................. A01G 9/02; A01G 9/10
[52] U.S. Cl. ................................... 47/86; 47/63; 47/74
[58] Field of Search ..................... 47/81, 86, 63, 74

[56] References Cited

U.S. PATENT DOCUMENTS

| | | | |
|---|---|---|---|
| 4,132,337 | 1/1979 | Masuda et al. | 47/86 |
| 4,578,899 | 4/1986 | Katila et al. | 47/86 |
| 5,058,320 | 10/1991 | Tsuru et al. | 47/86 |

FOREIGN PATENT DOCUMENTS

| | | | |
|---|---|---|---|
| 2725220 | of 1977 | Fed. Rep. of Germany | 47/86 |
| 1324006 | of 1963 | France | 47/86 |
| 5410107 | 1/1979 | Japan | 47/86 |
| 8403665 | 6/1986 | Netherlands | 47/86 |
| 261559 | of 1949 | Switzerland | 47/86 |

Primary Examiner—Richard E. Chilcot, Jr.
Assistant Examiner—Joanne C. Downs
Attorney, Agent, or Firm—Oliff & Berridge

[57] ABSTRACT

An assembly of pots for raising and transplantation of seedlings, the assembly made of paper or a paper-like thin film, in which the side wall of each pot is provided, by means of a cut, with tongue-like pieces which can be easily lifted-up toward the outside of the pot by the pressure of seedling roots while in the soil after transplantation, therefore, making the extension of roots from the tongue-like portion both vigorous and untangled with respect to adjacent potted seedlings.

7 Claims, 2 Drawing Sheets

FIG.4-a
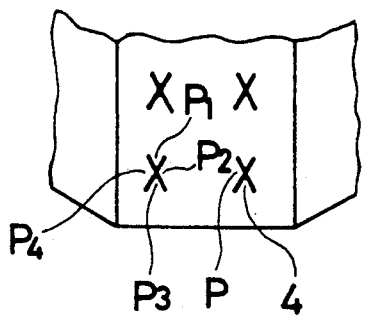
FIG.4-b
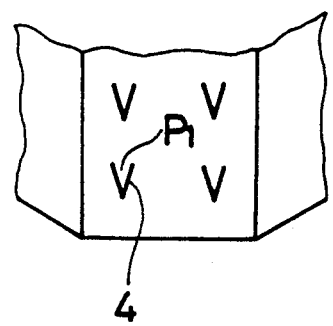
FIG.4-c
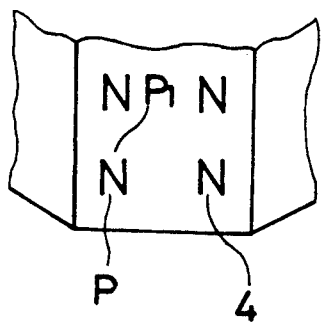
FIG.4-d
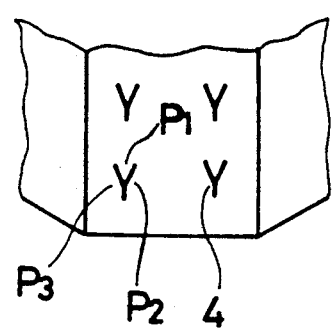
FIG.5
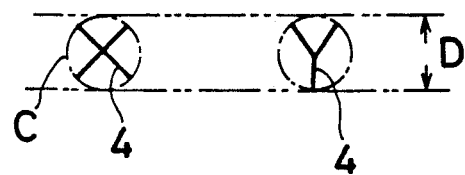

ASSEMBLY OF POTS FOR RAISING AND TRANSPLANTATION

BACKGROUND OF THE INVENTION

1. Field of the Invention

The present invention concerns an assembly of pots for raising and transplating seedlings (hereinafter simply referred to as pots) and, more particularly, it relates to pots having tongue-like pieces formed in the side walls by providing a very fine pattern of cuts to the side walls of each pot during manufacture.

2. Description of the Prior Art

A culture method for raising plant seedlings by using a pot made of paper or a paper-like thin film and then transplanting the thus obtained potted seedlings to a field has been generally used.

Most such pots used to culture plants are of a cylindrical form without top and bottom in which soils are added, seeds are sown, water is applied and then seedlings are raised for a predetermined period and the resultant seedlings are transplanted together with the pot to a field.

After the transplantation, since the pot gradually decomposes in the earth, roots of the seedlings can freely form and extend to make subsequent growth favorable. However, since the decomposition of the pot may be retarded due to the differeing quality of field soils, extension of the roots out of the pot may also be inhibited under such conditions thereby hindering plant rooting and subsequent growth.

In order to overcome such a disadvantage, there have been proposed, for example, cylindrical pots each open at both the upper and lower ends and having plural rows of holes passing through the circumferential surface thereof, as disclosed in the specification of Japanese Utility Model Laid-Open Sho 59-193251; and pots in which small apertures are perforated in the circumferential surface of the pot so as not to allow communication between adjacent pots as disclosed in Japanese Utility Model Publication Sho 51-12362.

However, the pots containing such small apertures at the side wall of the pot involve the following problem which must be overcome in practice.

That is, in the cylindrical pots open at both the upper and lower ends and having plural rows of holes formed in the circumferential surface as disclosed in Japanese Utility Model Laid-Open Sho 59-193251, since the holes in the side walls of the individual pots are arranged uniformly (refer to FIG. 1 of the publication), when the pots are used for raising seedlings and assembled together, the holes in the side walls of adjacent pots are in communication with each other (refer to FIG. 2 of the publication), roots of seedlings in adjacent pots entangle through the communication holes during raising making it difficult to separate them into individual potted seedlings after the completion of raising. Further, in the pots having small holes such that they are not in communication with the holes of adjacent pots, as disclosed in Japanese Patent Publication Sho 51-12362, entanglement of roots between the adjacent pots is eliminated during raising, however, an extremely complicated manufacturing step is required to provide such a structure with small holes in the side walls so as not to be in communication with the holes of adjacent pots.

In addition, individual pots are usually assembled by forming a strip-like body by successively connecting a predetermined number of collapsed hollow cylindrical bodies while overlapping them each at a ½ or ⅓ width to each other, laminating a predetermined number of such strip-like bodies and bonding between the adjacent layers by means of a water soluble paste. However, in the two types of assembled pots described above, since holes or small holes are formed at a portion constituting the side walls of the unassembled pot, paste coated between the adjacent laminated layers would adhere to surfaces not required to be bonded after passing through the holes, large or small, and hinder seedling development in the assembled pots.

In view of the foregoing, a need has been felt for an assembly of pots useful for rearing and transplanting seedlings that is free from structural problems and capable of allowing vigorous extension of roots out of the pots after transplantation.

SUMMARY OF THE INVENTION

The foregoing need can be satisfied in accordance with the present invention by an assembly of pots for raising and transplantation, in which cuts, each of a shape useful in forming at least one tongue-like piece, are provided at a plurality of positions along the side wall of each pot, the pots being made of a paper or paper-like thin film without lid and bottom.

BRIEF DESCRIPTION OF THE DRAWINGS

FIGS. 1–3 show examples of pots for raising and transplantation according to the present invention, in which:

FIG. 1 is a perspective view of a unit pot of a hexagonal shape provided with cross-like cuts on the side wall of the pot;

FIG. 2 is a perspective view illustrating a state of assembling unit pots;

FIG. 3 is a perspective view illustrating the state in which unit pots are connected in a row by means of connecting pieces;

FIGS. 4(a)–(d) illustrate examples of various kinds of cut shapes that can be employed in the present invention in which:

FIG. 4a shows an example of a cross-like configuration,

FIG. 4b shows an example of a V-letter-shaped configuration,

FIG. 4c is an example of an N-letter-shaped configuration, and

FIG. 4d shows an example of a Y-letter-shaped configuration; and

FIG. 5 is a schematic view illustrating the range or extent of the cut by a circle C connecting respective ends of the cut.

DETAILED DESCRIPTION OF THE PREFERRED EMBODIMENTS

As the paper or paper-like thin film for constructing an assembly of pots for raising and transplatation of seedlings according to the present invention, any film material having appropriate corrosion resistance and rigidity which is used in the construction of currently available pots may be used. For example, natural pulp paper or synthetic paper made from paper material such as paper making natural pulps, i.e., wood pulps prepared from coniferous trees and broad leaf trees, waste cloth, paper pulp or bagasse pulp, alone or in admixture with synthetic fibers such as those made of polyvinyl alcohol, polypropylene, polyethylene, polyolefin, polyester, polyamide, polyacrylonitrile and polyvinyl chloride, paper reinforced with wet strength by treating such natural paper or synthetic paper with cellulose cross-linking chemicals, composite paper prepared by laminating a thin layer of the synthetic fibers with the natural pulp paper by an appropriate means, and paper applied with corrosion resistant treatment by means of properly selected corrosion resistant chemicals to natural pulp paper or synthetic paper.

Figure 1:
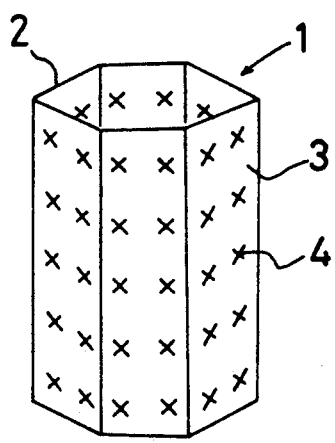

In FIG. 1, a unit pot (hexagonal column in the Figure) 1 comprises a thin film 2 properly selected from the group of various thin film materials as described above.

A side wall 3 of the pot made of the thin film 2 is provided with a plurality of cuts 4, for example, of a cross-like shape passing through the thin film 2.

The shape of the cut 4 in the side wall 3 of the pot is not restricted to the illustrated cross-like shape in that various shapes may be used. In this case, the shape of the cut 4 is such that at least one tongue-like piece P is formed, as described herein below.

Further, to ensure that no entanglement of roots is caused through the cuts 4 between adjacent pots during raising, the extensible tongue-like piece formed by the cuts 4 can easily lift-up out from the pot due to the pressure of the roots after transplantation. Additionally, the paste applied during fabrication of the pots does not intrude into the cuts 4 to cause unnecessary adhesion. The size of the cut 4 is preferably selected, as shown in FIG. 5, so that the diameter D of a circle C drawn by connecting respective ends of the cut 4 in the side wall 3 defines a range of from 5 to 15 mm. So long as this condition is satisfied, the shape of the cut is not restricted only to the cross-like shape that forms four tongue-like pieces $P_1$–$P_4$ as shown in FIG. 4a, but the cuts may be provided in a V-letter-shape, N-letter-shape or Y-letter-shape as shown in FIGS. 4b through 4d. In the latter cases, the tongue-like part is formed by one ($P_1$), two ($P_1$, P) and three ($P_1$, $P_2$, $P_3$) tongue-like pieces, respectively.

As described above, while the shape of the cut 4 can be selected optionally, the cross-like and Y-shaped configuration in which top ends of the tongue-like pieces P are gathered into a point, are more practical and preferred since the tongue-like pieces can lift-up and out from the pot more easily due to the pressure of the root.

The cut 4 can easily be applied to a thin film 2 or strip-like body during the manufacturing step by using diecut equipment, sharecut equipment or the like having a blade die corresponding to the properly selected shape of the cut 4.

Figure 2:
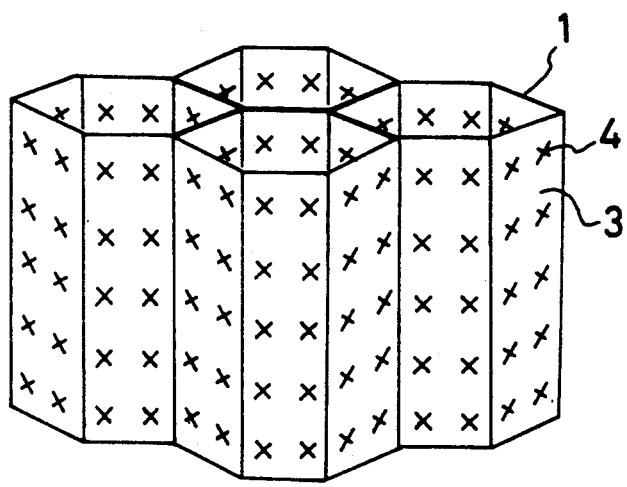

The assembly of pots shown in FIG. 2 has a shape and structure similar to that described, for example, in U.S. Pat. No. 3,164,507 or British Patent No. 992856 (however, cutting treatment is not applied at all to the side walls recited in this prior art). The assembly of pots having the cut 4 in the side wall of the pot are of such a structure as can be obtained by providing cross-like or other similar cuts 4 to a preselected thin film 2 by means of the die cut or share cut equipment described above (while keeping the cut 4 from extending to both side edges of a collapsed hollow cylindrical body formed with the thin film 2 described below), preparing a plurality of collapsed hollow cylindrical bodies formed of thin film 2 and provided with the cut 4, arranging a predetermined number of the collapsed hollow cylindrical bodies in a lateral direction while successively overlapping them, each by ⅓ lateral width to each other, alternately and vertically bonding the overlapped portions with water soluble paste to form a strip-like body, laminating a predetermined number of strips, bonding each adjacent layer with water soluble paste, drying and then assembling them. However, when each of the collapsed hollow cylindrical bodies is bonded to another by the water soluble paste, and when a predetermined number of strip-like bodies formed by the connected collapsed hollow cylindrical bodies are laminated and the adjacent layers are bonded by the water soluble paste, and since the width of the cut 4 is extremely fine, the paste applied to the cut 4 does not substantially penetrate the cut 4 and only adheres to the opposing face. Thus, there is no disadvantage of hindering seedling development in the pots after assembling.

Figure 3:
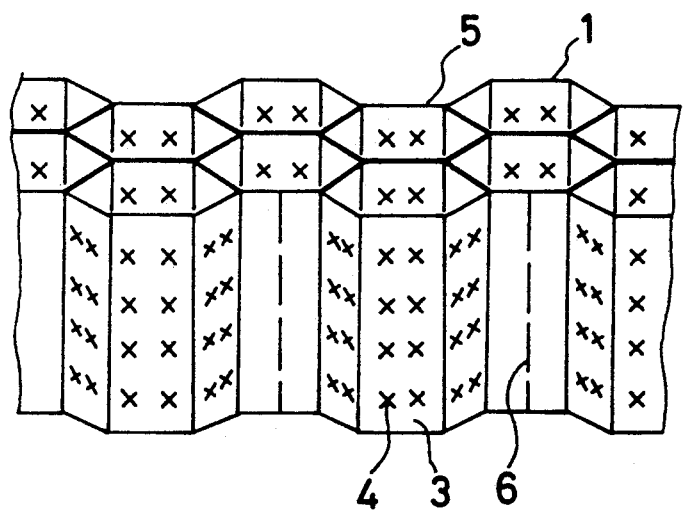

Further, the assembly of pots shown in FIG. 3 has a similar structure to that of the assembly of pots in which individual pots are connected in a row by means of connection pieces 5 as disclosed in, for example, U.S. Pat. No. 4,132,337 or Great Britain Patent No. 1559343 (however, no cutting treatment is applied at all to the side wall in this prior art). The assembly of the pots having the cut 4 in the side wall of each pot of this structure is formed, for example, by mating the two sheets of the thin film 2 in parallel, bonding the two sheets by means of a water resistant paste applied in a predetermined pattern with a predetermined interval in the longitudinal direction of the thin film 2, and in the direction perpendicular to the longitudinal direction of the thin film to form a continuous strip-like body, providing cross-like or other cuts 4 to the strip at predetermined intervals throughout the area except for the bonded area, bonded by the water resistant paste, by using, for example, diecut or sharecut equipment, applying easily separatable separation lines 6 to that portion using an appropriate means in a connection piece 5 formed by bonding with the water resistant paste folding the strip-like body in a zig-zag form in a predetermined manner, bonding the folded body by pushing pressure and after drying them assembling the bonded body. Also in this case, since the width of the cut 4 is extremely fine the paste applied to the cut 4 does not substantially bond the opposing face through the cut 4 and, therefore, causes no disadvantage by hindering seedling development in the pot after completion of assembly.

In this way, an assembled or unassembled pot for raising and transplantation of seedlings having a cut 4 in the side wall of the pot according to the present invention, can be obtained. The assembly of pots for raising and transplantation according to the present invention is not restricted only to the above illustrated embodiment. Various other kinds of structures and forms may be provided to the assembly of pots having the cut 4 in the side wall of the pot.

When soils are added, seeds are sown and water is applied for raising in the thus assembled pots, for example, as shown in FIG. 2 provided with the cut 4 in the side wall 3 according to the present invention, the tongue-like pieces formed by the cuts 4 constitute "doors" between each of the adjacent pots during raising, which prevent entanglement of the roots between the adjacent pots. After separation of the assembled seedling pots into individual seedling pots subsequent to raising and transplantation to the field, the tongue-like pieces P can easily lift-up to the outside of each pot due to the embrittlement of the thin film coupled with the extending pressure of the roots, thereby making the extension of the roots easier through the portions (i.e., portion of extended tongue-like pieces), early rooting is enabled for the transplanted seedlings and subsequent growth is made easier.

In the assembly pots for raising and transplantation of seedlings according to the present invention, the extension of roots through the side wall of the pot is facilitated irrespective of the kinds of soils found in the transplanted field. Therefore, the advantages brought to the assembly of pots described above can only be gained as described herein.

For better understanding of the present invention, manufacturing examples and test examples are shown below.

MANUFACTURING EXAMPLE 1

Non-continuous hexagonal assembly of pots:

A continuous craft paper having basis weight of 60 g/m$^2$ and width of 126 mm, to which 3% of benzimidazole series sterilizer was added (3% based on the weight of the paper), was pulled out continuously and a width of 6 mm on one side edge was used as margin. Y-letter-shaped cuts, each having 5 mm fragment lengths, were continuously provided to other areas of the paper, except for the margin, by a rotary die cutter set to a lateral distance of 20 mm from the other side edge and 25 mm distance in the pulling direction, while adjusting the position such that the initial position for the cut was at 12.5 mm from the top end of the craft paper. Water resistant paste was applied to the margin (of 6 mm width) and then the other side edge was mated, bonded, and collapsed to form a continuous collapsed hollow cylindrical body having a width of 60 mm.

Eight rows of such continuous collapsed hollow cylindrical bodies were prepared and connected successively while overlapping each other by ⅓ width and arranged alternately in the lateral direction.

The continuous strip-like bodies were cut into pieces of 150 mm length and 18 sheets of such pieces were laminated and bonded to each other by means of a water soluble paste. Then, they were cut into a length of 50 mm and assembled to obtain three sets of non-continuous pots for raising and transplantation of seedlings, assembled laterally and longitudinally from 144 (one set) hexagonal pots with 40 mm diameter and 60 mm height having two Y-letter-shaped cuts not extended over the folded lines to each of the side walls of the pots divided by the folded lines upon development. The assembly, it was observed, could be attained satisfactorily without deformation of the shape or unnecessary adhesion to other surfaces through the cuts.

MANUFACTURING EXAMPLE 2

Non-continuous square cylindrical assembly of pots:

A continuous craft paper having a basis weight of 55 g/m$^2$ and width of 206 mm to which 2% of 8-oxyquinoline copper type sterilizer was added (based on the weight of paper) was pulled out continuously. Water resistant paste was applied to a 6 mm width on one lateral side as a margin, the other side is mated thereto, bonded and collapsed to form a continuous collapsed hollow cylindrical body.

Six rows of such continuous collapsed hollow cylindrical bodies were prepared and they were connected while being overlapped each by ⅓ width to each other, such that they constitute a step-width arrangement in the lateral direction and each adjacent row was bonded by applying a water soluble paste to form a continuous strip-like body of 350 mm width.

N-letter-shaped cuts each having a fragment length of 7 mm were continuously provided to the continuous strip-like body while adjusting the position such that the initial position of the cut was situated 12.5 mm from the top end of the continuous strip-like body and the positions for both sides were situated at 15 mm inward respectively from the side edges by a rotary die cutter which was set to the lateral distance of 20 mm, 30 mm (repetition of 20 mm, 30 mm), 30 mm and 20 mm distance and 25 mm distance in the longitudinal direction, and then they were cut into pieces of 100 mm length. 12 sheets of such pieces were turned front to back on every other sheet and laminated. The laminates were bonded by means of a water soluble paste and then were cut into 50 mm lengths and assembled to obtain two sets of non-continuous pots for raising and transplantation in which 72 (one set) square cylindrical pots each having 50 mm side and 50 mm height having two N-letter-shaped cuts formed in each side wall of the pots divided by the folding lines laterally and longitudinally upon assembly. Assembly could be attained satisfactorily without observed deformation or unnecessary adhesion to the other faces through the cuts.

MANUFACTURING EXAMPLE 3

Continuous type hexagonal assembly of pots:

Continuous synthetic fiber-mixed craft paper having a basis height of 55 g/m$^2$ and width of 414 mm was mixed with 2% by weight of 8-oxyquinoline copper sterilizer, 10% by weight of polypropylene fibers and was pulled out. Then, a water resistant paste was applied to the surface of the paper perpendicular to the pulling direction by continuously repeating units, each unit having 6 repetitions of a paste application step comprising a 15 mm width of paste application and successive 45 mm width application of paste perpendicular to the pulling direction. Then, the same separately prepared paper was mated and bonded to form a continuous strip-like body comprising the bonded area and the non-bonded areas alternately.

Then, cross-like cuts, each of 6 mm length, were provided continuously to the continuous strip-like body while adjusting the initial position of the cuts at 7.5 mm from the top end of the strip-like body and at 11.5 mm from one side edge by using a rotary die cutter which was set to 23 mm of lateral distance and 15 mm of distance in the pulling direction. Then, separation lines were attached over the entire width of the bonded area with the water resistant paste of 15 mm width situated at the front end in each of the units, and they were folded in a zig-zag manner 44 times with the boundary between the bonded area by the water resistant paste and the non-bonded area, situated at the final area of each unit as the folding portion, and then laminated and bonded by the water soluble paste.

The laminate was cut laterally into 46 mm lengths and assembled to obtain a continuous pot for raising and transplantation of seedlings in which 264 hexagonal pots each of 30 mm diameter and 46 mm height, having two cross-like cuts not extended over the folding lines to the side wall for each of the pots divided by the folded lines, are assembled so as to be drawable in a row by means of connecting pieces formed along with the appended area by the water resistant paste. Assembly could be attained without deformation satisfactorily and adhesion to other unnecessary faces through the cut was not observed.

CULTURE TEST EXAMPLE

Assembly of hexagonal pots (2 sets) each having cuts on the side wall of each pot (non-continuous type) as obtained in Manufacturing Example 1 and a comparative assembly of hexagonal pots (2 sets) having no cuts in the side wall of each pot also obtained in the same manner as in Example 1 (except for not providing the cuts) were used. Culture soils were added to each of the pots, seeds of cabbage were sown by one/pot and after raising under the same conditions in the greenhouse for 21 days, they were separated into individual pot seedlings and transplanted to a field in the greenhouse and tested for growing and harvest.

The results are as shown in Table 1 and it was recognized that the culture in the pot of Example 1 with cuts was superior to the case of the comparative pot in each of the test items. In particular, for the number of roots penetrating the pots, the pot of Example 1 with cuts showed a remarkable effect (due to the cuts), showing ten times as much results as compared with the comparative pot. As a result, the example showed 35% increase in yield.

The data shows an average value per one pot and is indicated based on the result of the comparative pot being assumed as 100.

TABLE 1

| | Leaf Length (cm/pot) | Situation 30 days after transplantation | | 50 days after transplantation | |
|---|---|---|---|---|---|
| | | Number of Leaves (sheets/pot) | Leaf Weight (g/pot) | Number of roots penetrating pot (number/pot) | yield (g/pot) |
| Comparative pot | 100 | 100 | 100 | 100 | 100 |
| Pot of Ex. 1 | 109 | 104 | 151 | 1000 | 135 |

What is claimed is:

1. An assembly of pots for raising and transplantation of seedlings in which a plurality of pots without lid and bottom made of at least one of paper and paper-like thin film comprising:

a side wall of each pot being joined to a side wall of each adjacent pot by means of at least one of a water soluble paste and a connecting piece;

the assembly of pots further comprising pots with at least one tongue-like piece which is provided at plural places in the side wall of each pot;

said tongue-like piece being easily lifted-up and outward from the pot by growing roots;

the tongue-like piece being formed by means of plural cuts intersecting at a vertex and which are provided to allow seedling roots to pass untangled outwardly through the side walls of each pot.

2. An assembly of pots for raising and transplantation of seedlings as defined in claim 1, wherein the cuts forming the tongue-like piece are provided to the side wall of each pot and have a cross-like shape.

3. An assembly of pots for raising and transplantation of seedlings as defined in claim 1, wherein the cuts forming the tongue-like piece are provided to the side wall of each pot and have a Y-letter-shaped configuration.

4. An assembly of pots for raising and transplantation of seedlings as defined in claim 1, wherein the size of cut is predetermined such that the diameter of a circle drawn by connecting respective ends of a single cut defines a range of about 5 to 15 mm.

5. An assembly of pots for raising and transplantation of seedlings as defined in claim 1, wherein the cut has such an extremely fine width that a substantial amount of paste used to bond the opposing pot surfaces does not pass through the cut.

6. An assembly of pots for raising and transplantation of seedlings as defined in claim 1, wherein the cuts forming the tongue-like piece are provided to the side wall of each pot and have a shape consisting of one of an N-letter-shaped configuration and a V-letter-shaped configuration.

7. An assembly of pots for raising and transplantation of seedlings as defined in claim 1, wherein the cuts forming the tongue-like piece are provided to the side wall of each pot and have a shape consisting of a combination of a cross-like shape, a Y-letter-shape, an N-letter-shape, a V-letter-shape, and other cuts forming at least one vertex.

* * * * *